United States Patent [19]

Allen

[11] Patent Number: 5,051,044

[45] Date of Patent: Sep. 24, 1991

[54] PIPE DRILLING APPARATUS

[76] Inventor: Harold Allen, 874 Redondo Dr., Anaheim, Calif. 92801

[21] Appl. No.: 487,916

[22] Filed: Mar. 5, 1990

[51] Int. Cl.[5] .............................................. B23B 49/00

[52] U.S. Cl. ........................................ 408/92; 408/16; 408/135; 408/111; 408/112; 74/89.17; 33/371

[58] Field of Search ................. 408/92, 234, 236, 103, 408/104, 107, 100, 99, 135, 112, 712, 136, 111, 112, 108, 16, 716; 33/334, 21.3, 529, 382, 370, 371, 373; 269/902; 74/89.17

[56] References Cited

U.S. PATENT DOCUMENTS

| | | | |
|---|---|---|---|
| 256,337 | 4/1882 | Lawrence | 408/111 |
| 2,997,900 | 8/1961 | Pugsley | 408/712 X |
| 3,922,107 | 11/1975 | Fowler | 408/92 X |
| 3,967,687 | 7/1976 | Fowler | 408/92 X |
| 4,094,612 | 6/1978 | Krieg | 408/92 |
| 4,572,715 | 2/1986 | Wolff | 408/112 X |
| 4,936,720 | 6/1990 | Dolatowski et al. | 408/111 X |

FOREIGN PATENT DOCUMENTS

| | | | |
|---|---|---|---|
| 2504872 | 8/1976 | Fed. Rep. of Germany | 408/112 |

*Primary Examiner*—Larry I. Schwartz
*Assistant Examiner*—Robert Schultz
*Attorney, Agent, or Firm*—G. Donald Weber, Jr.

[57] ABSTRACT

An apparatus which is used to enhance the capability of in situ drilling of holes in existing pipes or other conduits, or virtually any cylindrical object. The apparatus includes a mounting unit which rests upon the pipe to be drilled and a drill mounting apparatus. The drill mounting apparatus is removably mounted to the mounting unit. The drill mounting apparatus is adapted to receive and position a drilling device which forms a hole in the pipe or the like.

25 Claims, 2 Drawing Sheets

PIPE DRILLING APPARATUS

BACKGROUND

1. Field of the Invention

This invention is directed to a drill mounting apparatus, in general, and an apparatus which carefully and precisely positions a drilling apparatus relative to a cylindrical member such as a pipe or the like which is to be drilled, in particular.

2. Prior Art

There are many instances wherein it is necessary and/or desirable to drill a hole in the sidewall of an existing conduit such as a pipe or the like. In most cases, this operation is performed in conjunction with a renovation or modification of an existing plumbing system, such as, but not limited to, fire sprinkler systems or the like. Thus, it is highly desirable to drill the hole, in situ, in order to avoid the costs of major renovations of the existing plumbing system. However, sometimes the operation is performed in conjunction with a repair project or with new pipe before it is installed at the work site.

In the past, the practice was to initially drill a small pilot hole in the pipe and then drill a larger hole with the appropriate size drill bit. This arrangement caused numerous problems especially in terms of the precision in forming the hole. In addition, as often as not, the operation resulted in damage to the existing conduit, injury to the operator, and/or other difficulties, such as broken hole saws, broken drill bits, excessive chips in the conduit and so forth.

Subsequently, clamping arrangements were developed which vary from very crude devices to somewhat more sophisticated devices. In the existing devices, it is typical to position a support base or the like on a conduit adjacent to the location of the hole to be drilled.

For example, one prior art hole cutting tool is referred to as a Vic-Hole Cutting Tool (VHCT). This unit is quite large and cumbersome inasmuch as the drilling apparatus is mounted between a pair of alignment shafts and above the support bracket therefor. In addition, the feed adjustment mechanism is also supported on the support bracket. Consequently, this unit becomes extremely large and cumbersome. Also, this apparatus requires the operator to make a 3-piece assembly in order to position the tool. In this device it has proven easy to drop components which is very time consuming when the operator is standing on a ladder.

Another unit known in the art is described as a Hydraulic Pipe Drill manufactured by Widder. However, this product has a single alignment mechanism for supporting a drill. This alignment mechanism is quite large in the vertical dimension and includes an elongated ratchet handle which further limits the utilization space for this device. Also, the single alignment post tends to produce a unit which has inherent stability problems.

Another prior art tool is referred to as "The Hole Thing" manufactured by Fend Industrial Tool Inc. This unit has a cleat type mounting unit which provides an unsteady mounting relative to the pipe to be drilled. The drill travel plate is mounted in the support mechanism in a rack-and-pinion gear drive arrangement which requires a relatively large vertical space for insertion of the tool. Again, this tool requires an operator to assemble two pieces and use a loose rod for a handle to engage tool. This assembly can be cumbersome as noted above.

SUMMARY OF THE INSTANT INVENTION

The instant invention includes an angulated base or saddle which is adapted to be placed on a conduit such as a cylindrical pipe or the like. The base includes a pair of tubes which extend from the vertex of the angulated base. The tubes are parallel to each other and perpendicular to the vertex line of the base. A suitable chain wrench apparatus is mounted to the open ends of the angulated base in order to encircle and securely clamp the base to the conduit.

A drill mounting apparatus movable relative to the base, is also provided. The drill mounting apparatus includes a plate with a pair of post-receiving apertures therethrough. In addition, the drill mounting unit includes a pivotally mounted clamp arm at one end thereof for engaging, a drill unit. A pair of posts are passed through the respective apertures. The posts mate with the tubes in the base. (In another embodiment, the tubes could include the posts as integral therewith.)

A rack gear is affixed to at least one of the posts. A spur gear is mounted to the drill mounting apparatus for selectively engaging and driving the rack gear. The drill mounting apparatus is spring-loaded and biased away from the angulated base but is selectively moved toward (or away from) the base by the interaction between the spur gear and the rack gear.

Spirit levels can be mounted to the drill mounting apparatus in order to determine the positioning of the drill relative to the conduit to be drilled.

DESCRIPTION OF THE PREFERRED EMBODIMENT

Figure 1:
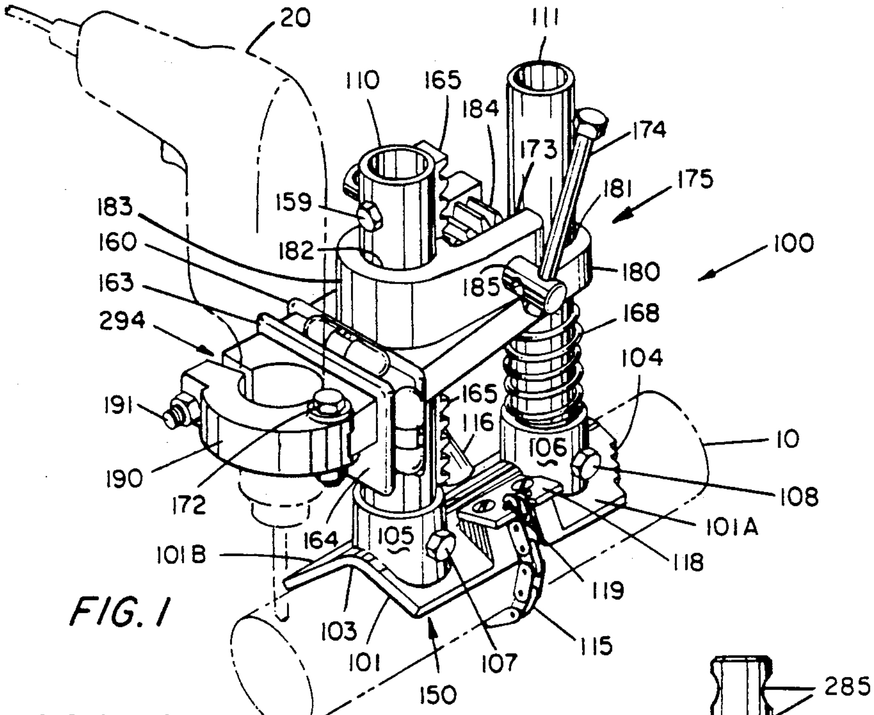
FIG. 1 is an isometric view of the apparatus of the instant invention.

Referring now to FIG. 1, there is shown an isometric view of the apparatus of the instant invention mounted on an existing conduit. In particular, the apparatus 100 is mounted on a conduit or pipe 10. While the conduit 10 is, typically, a hollow tube such as a pipe, it is also possible that conduit 10 can be a rod or the like. Typically, the conduit 10 is part of an existing plumbing system which may be quite extensive. The apparatus 100 permits a hole to be precisely drilled into (or through) the conduit without removing the conduit 10 from the existing system. Of course, the apparatus may also be used in shop construction and is not limited to in situ operation.

The mounting apparatus 150 includes a mounting base 101 (sometimes referred to as a saddle) which is angulated so as to rest securely on a generally cylindrically shaped conduit. In particular, the angulated mounting base 101 includes a pair of plates 101A and 101B which are joined together at a peak or vertex 103. Preferably, the plates are joined at a 120° angle. Of course, other angles are possible. However, an angle of 120° has been shown to be quite effective and tends to be self centering of the base 101 relative to the conduit 10. The base 101 may be formed of a stainless steel alloy, a high impact plastic or other material of suitable strength and durability.

One end of the base 101 includes a stepped section 104. The stepped section includes a plurality of set-back steps or cutouts. The stepped section 104 is arranged to provide an indicia which can be used to measure (or represent) the diameter of the conduit 10 when the base 101 is mounted thereon. That is, each step represents a different diameter conduit. This provides an advantageous feature to the operator of the apparatus to visually check the diameter of the conduit 10 without the necessity of additional measuring or the like.

In a preferred embodiment, a pair of tubes 105 and 106 extend upwardly from the vertex 103 of the base 101. The tubes are substantially parallel to each other and substantially perpendicular to the vertex 103 of the angled base 101. In the preferred embodiment, the tubes 105 and 106 are hollow and function as seats or receptacles for posts 110 and 111 which are joined to the tubes by suitable means, such as nuts and bolts 107 and 108. Of course, other connectors can be used.

The pair of posts 110 and 111 extend upwardly from the base 101 in parallel, spaced apart relationship. These posts can be hollow tubes or solid rods, as desired. At least one of the posts includes a rachet or rack gear 165 on one side thereof. The rack gear 165 may be integrally formed on the post or mounted thereto by bolt 159. The rack gear 165 engages and is driven by spur gear 184.

As noted, a spring 168 is provided around post 111 so as to bias the drill mounting apparatus 175 upwardly from the mounting base 101. Additional springs can be provided on post 110 (or elsewhere) if desired.

In the event that separate tube or post arrangements are required or desired, the posts can be separately provided and pass through the apertures in the mounting unit into engagement with the post receiving "seats" in the mounting apparatus.

In another embodiment, the posts 110 and 111 can extend upwardly directly from base 101. That is, the posts 110 and 111 can be joined integrally with the base 101 whereupon separate seats 105 and 106 are not required. However, this construction tends to make the apparatus bulkier for handling and storage.

Typically, the posts support and position the drill mounting apparatus 175 relative to the base 150. The post 110, along with rack gear 165 and spur gear 184, effectively controls the position of the drill mounting apparatus 175. The post 111 serves to stabilize the drill mounting apparatus 175. In addition, the spring 168 is mounted on post 111 so as to urge the drill mounting apparatus 175 away from the base 150 when pressure on the rack gear 165 is removed or diminished.

In addition, the base 101 includes a typical Morse wrench chain. In this instance, a suitable chain 115 is provided Any conventional chain, such as a bicycle chain or the like, can be utilized. One end of the chain is pivotally, mounted in a chain adapter mechanism 116 (see FIGS. 5 and 7). The adapter mechanism 116 includes a tube or other similar mounting apparatus mounted on one side of the base 101 and is described in detail infra. The chain may be adjusted by modification of the adapter mechanism.

The other end of the chain includes a suitable lock mechanism 118. The lock mechanism engages a slot 119 or similar arrangement formed in the other side of the angulated base 101. Thus, the chain 115 is mounted in the adapter 116, positioned around the conduit 10 and engaged with the slot 119 in locking apparatus 118 in a relatively snug fashion. The adapter mechanism is then operated to secure the chain 115 and, thus, the mounting base 101, in close engagement to the conduit 10. This chain-lock attachment prevents the apparatus 100 from moving relative to the conduit.

As will be discussed hereinafter, the chain, per se, is capable of modification (especially, in length) for purposes of utilization with conduits or pipes of varying sizes.

The drill mounting apparatus 175 includes a relatively planar support plate 180. Aperture 181 is provided adjacent one end of the plate 180 of the mounting apparatus 175. Aperture 182 is provided at approximately the mid-portion of the plate 180 of the mounting apparatus 175. The second aperture can be included in an enlarged portion 183 which extends above the surface of the plate 180. This enlarged portion (hereinafter gear housing 183) is adapted to mount a spur gear 184. The axis of spur gear 184 is substantially parallel to the upper surface of the plate 180. The spur gear is mounted on a suitable axle 185 which extends beyond the gear housing 183 and the plate 180. Axle 185 is adapted to receive an elongated lever 174 Which is used to selectively cause the spur gear 184 to rotate when activated by the operator of the apparatus. The spur gear 184 is mounted in a slot 173 formed in the rearward portion of the gear housing 183 noted above.

The other end or front of the plate 180 includes a pivotally mounted clamp arm 190 which is adapted to retain the drill apparatus 20 (shown in phantom line) in position. The clamp arm 190 is pivotally mounted to the plate 180 in a suitable fashion such as a using a nut and bolt 172, rivet or the like. In addition, an adjustment member 191 in the form of a threaded rod extends from the end of plate 180 and passes through an aperture 291 in the free end of the clamping arm 190. A suitable threaded member 292 such as a wing nut or the like is engaged with the threaded rod 191 of the adjustment member. This apparatus is used to secure the clamp arm 190 in position so as to selectively retain the drill device securely when in use. Also, clamp arm 190 permits the operator to selectively position or remove the drill for storage or other use or to use different drills according to need.

A spirit level 160 is mounted on the upper surface of the plate 180 to provide an indication of the positioning of the apparatus. In addition, spirit level 161 is mounted perpendicular to spirit level 160 so as to provide a 90° orientation indication. By using the two spirit levels, the correct orientation of the drill mounting apparatus can be achieved. The fins 163 and 164 protect surface mounted levels 160 and 161 from damage. In addition, the raised fins 163 and 164 are machined to permit the operator to also place a hand held level on the tool as the operator may elect to do.

Figure 2:
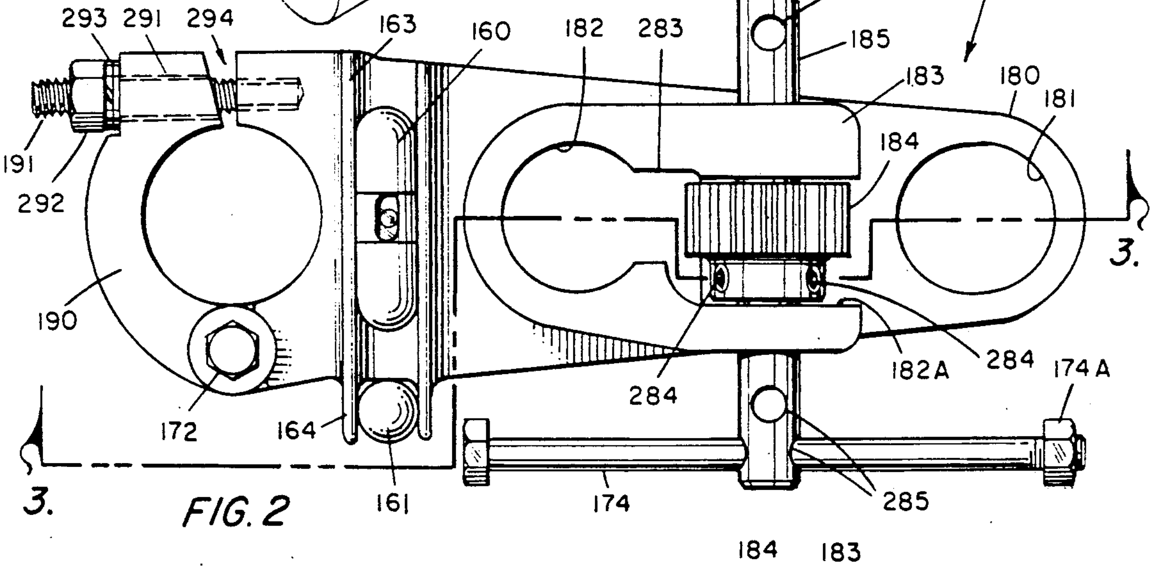
FIG. 2 is a plan view of the drill mounting apparatus of the instant invention.

Referring now to FIG. 2, there is shown a top or plan view of the drill mounting apparatus 175 of the instant invention. The planar base is shown as a relatively elongated plate 180 which, for convenience, has rounded ends. Plate 180 includes aperture 181 at one end thereof and aperture 182 at approximately the mid-point in the length of the plate 180. The aperture 181 is adapted to receive post 111 while aperture 182 is adapted to receive post 110 together with the rack gear 165. The spur gear 184 is mounted to the axle 185 by means of appropriate set screws 284 or the like.

The axle 185 includes a plurality of apertures 285 which pass therethrough. It is seen that there are two apertures at each end of the axle. These two apertures are disposed orthogonally to each other and, therefore, in quadrature around the axle. The apertures 285 are provided to receive the turning lever 174 which comprises an elongated rod which is adapted to be mounted in which ever aperture 285 is desirable. Thus, right-hand or left-hand operation of the apparatus is permissible. Also, in close quarters, the lever 174 is adapted to have the nut 174A removed therefrom so that the lever can be moved from aperture-to-aperture to obtain operation from either side of the apparatus and/or from a 90° re-orientation of the axle 185.

The axle 185 passes through the gear housing 183 which extends above the surface of base plate 180 and forms a slot 182 at the rear portion thereof to receive the spur gear 184.

At the other end of the drill mounting apparatus 175, there is provided the pivotally mounted clamp arm 190. One end of the arm 190 is pivotally mounted to the plate 180 by means of a suitable nut and bolt arrangement 172, a rivet or the like. A threaded rod 191 extends outwardly from the end of plate 180 and passes through an oversize hole 291 in the other end of arm 190. Thus, the free end of arm 190 can easily move along the threaded rod 191. A suitable nut 292 and appropriate washers 293 (or lock washers) can be used to secure the pivot arm 190 in position relative to base 180. The gap 294 between the end of arm 190 and the end of base 180 is provided so that drills (such as drill 20 seen in FIG. 1) of different sizes can be accomodated.

A spirit level 160 is mounted on the surface of plate 180 between the fins 163 and is used to provide one indication of orientation of the apparatus. Spirit level 161 is mounted at the side of plate 180 between fins 164 and provides another indication of orientation. Typically, the levels are mounted at 90° orientation relative to each other.

Figure 3:
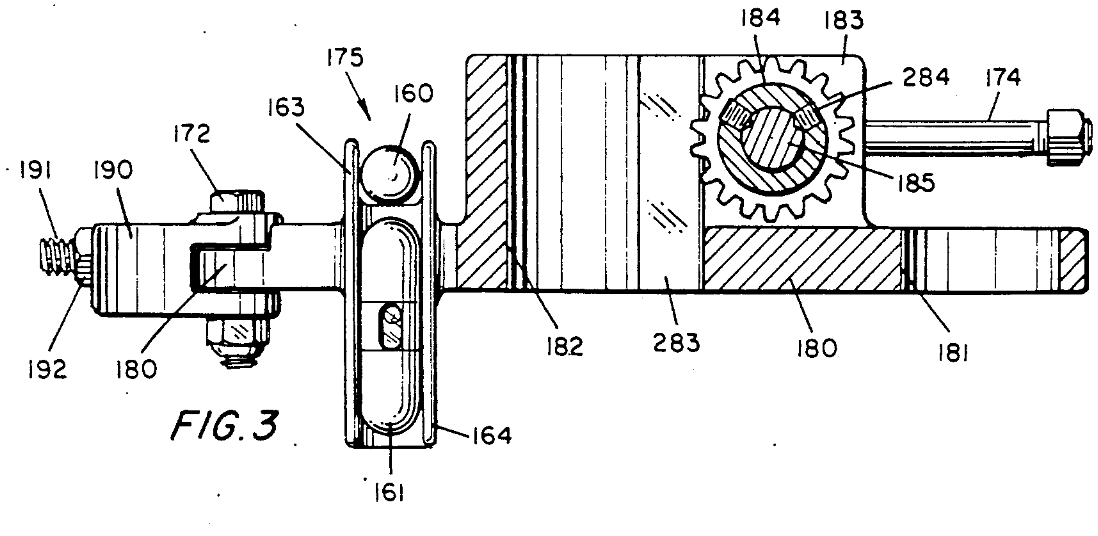
FIG. 3 is a partial cross-sectional view of the drill mounting apparatus taken along the line 3—3 of FIG. 2.

Referring now to FIG. 3, there is shown a partial cross-sectional side view of the drill mounting apparatus 175. The plate 180 defines the apertures 181 and 182 which pass therethrough. The aperture 182 also passes through the gear housing 183. The spur gear 184 is mounted on the axle 185 by means of set screws 284, for example. The lever 174 passes through the axle 185, as noted above. The gear housing 183 includes the aperture 182 and the neck portion 283 which receive the post 110 and the rack gear 165, respectively.

The spirit levels 161 and 160 are mounted between the fins 164 and 163, respectively, as noted above. The pivot arm 190 is mounted to the end of base plate 180 by means of the pivot apparatus 172 which can be a nut and bolt combination, a rivet or the like.

The threaded rod 191 is secured to the free end of pivot arm 190 by means of nut 192 or the like.

Figure 5:
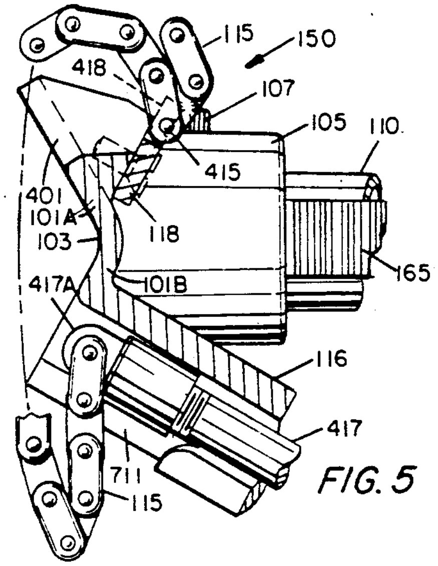
FIG. 5 is a partial cross-sectional view of a portion of the saddle base taken along the lines 5—5 in FIG. 4.
Figure 4:
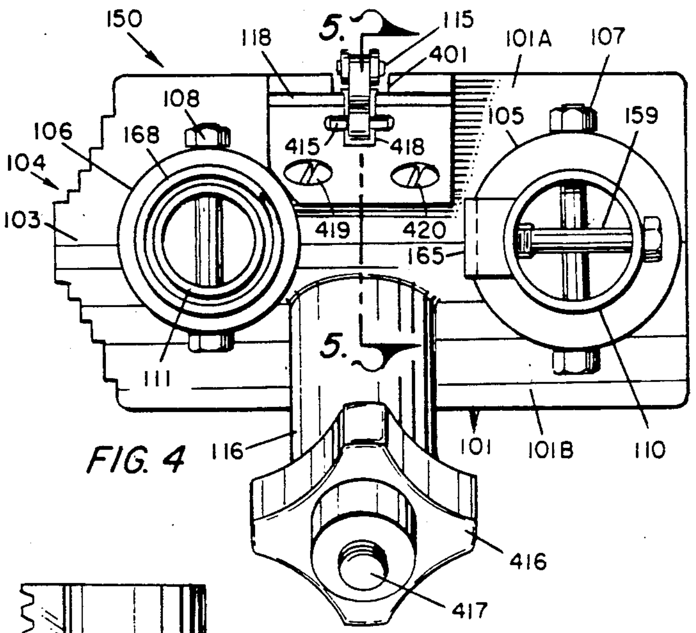
FIG. 4 is a top view of the saddle base portion of the instant invention.

Reference is now made to FIGS. 4 and 5 concurrently. In particular, FIG. 4 shows a top view of the mounting apparatus 150. FIG. 5 is a cross-sectional, detailed view of the mounting apparatus 150 taken along the line 5—5 in FIG. 4. The apparatus 150 includes the angulated base 101 which includes the plates 101A and 101B which are joined together at vertex 103. The stepped end 104 of the base provides the diameter measurement guage for the conduit 10 (not shown). The post seats 105 and 106 are spaced apart and substantially vertical and normal to the vertex 103 of the base 101. The posts 110 and 111 are shown mounted in the post seats 105 and 106, respectively. The spring 168 is shown encircling post 111. The post 111 is secured in the seat 106 by the nut and bolt 108. Similarly, the post 110 is secured in the seat 105 by the nut and bolt 107. The bolt 159 is shown passing through post 110 and connecting the rack gear 165 to the surface of the post 110. As noted, the posts 110 and 111 are detachably mounted in the respective post seats.

The tube 116 to which the chain 115 is attached extends at an angle from the plate 101B (see also FIG. 5). Typically, this angle may be 90° but the invention is not so limited. A suitable knob such as a four-point, star-shaped handle 416 is mounted adjacent to the tube 116. The knob 416 is threadedly mounted onto rod 417 which passes through the knob 416 and through the tube 116. The rod 417 is connected to the chain 115 by a clevis 417A at one end of the rod. The chain 115 extends out of the bottom end of tube 116. The slot 711 is provided for chain 115 in the event that a relatively large conduit is be drilled.

The other end of chain 115 is arranged to pass through a slot 401 in plate 101A and to engage the chain latching plate 118. For example, chain 115 may include a pin 415 which engages slot 418 in latching plate 118. Plate 118 is joined to the plate 101 by means of screws 419 and 420, for example. Other means of mounting the latching plate 118 to the base 101 are contemplated.

Figure 6:
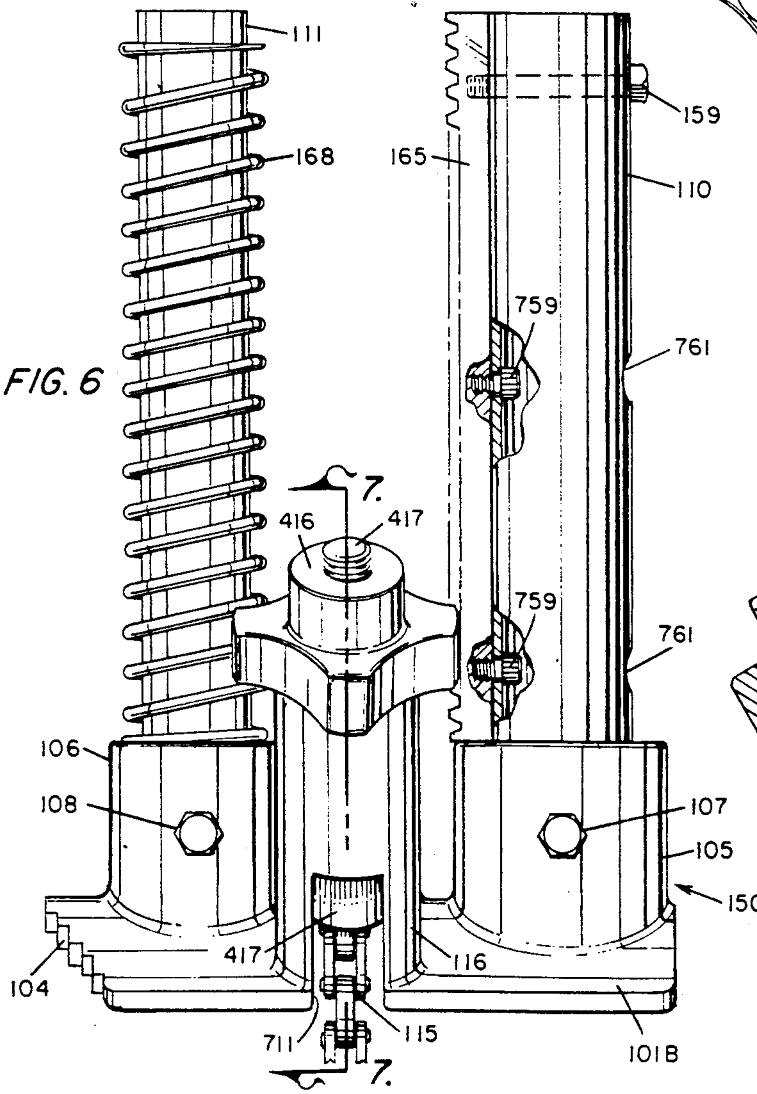
FIG. 6 is a side view of the saddle base portion of the instant invention.

Referring now to FIG. 6, there is shown a plan view of the mounting apparatus 150 taken from the chain wrench side. The posts 110 and 111 are depicted in the post seats 105 and 106, respectively. The measuring gauge 104 includes a plurality of stepped portions of different dimensions as noted above. The top of rack gear 165 is mounted to post 105 by bolt 159. This bolt also acts as a stop to prevent the drill mounting apparatus 175 from passing upwardly over the end of post 110 when fully assembled.

In addition, rack gear 165 is mounted to post 110 by the short bolts 759 (which can be Allen screws or the like). The bolts 759 are assembled by passing through the apertures 761 in the posts 110. Thus, the rack gear 165 is securely mounted to post 110 without interfering with the operation of drill mounting apparatus.

The spring 168 surrounds post 111 and urges plate 180 and the drill mounting apparatus 175 away from the base 150.

The chain 115 extends out of the chain tube 116. The chain length is adjusted by the turning of knob 416 on threaded rod 417. The bolts 107 and 108 secure the posts 110 and 111 in the post seats 105 and 106, respectively.

Figure 7:
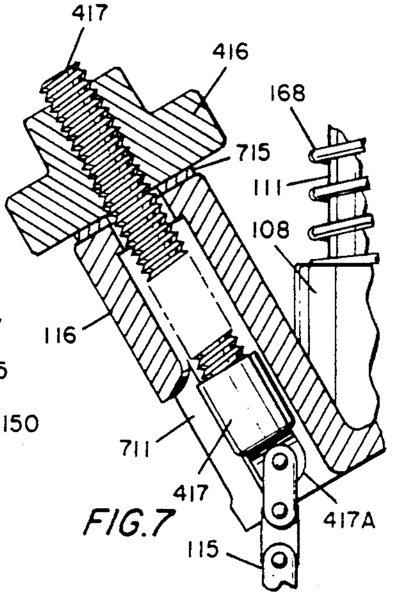
FIG. 7 is a cross-sectional, detailed view of a portion of the chain wrench of the instant invention taken along the line 7—7 in FIG. 6.

In FIG. 7, a cross-sectional detailed view of the tube 116 is provided. The chain is attached to the end 417 of clevis 417A which is attached to threaded rod 417. Knob 416 is threadedly mounted on the rod 417. As knob 416 is turned, the rod 417 is moved in or out of tube 116 whereby chain 115 is tightened or loosened around the conduit (not shown). The washer 715 provides a bushing for the chain lock. The slot 711 permits the chain 115 to follow the contour of the conduit.

Thus, there is shown and described a unique design and concept of a pipe drilling apparatus. The particular configuration is shown and described herein. While this description is directed to a particular embodiment, it is understood that those skilled in the art may conceive modifications and/or variations to the specific embodiments shown and described herein. Any such modifications or variations would fall within the purview of this description are intended to be included therein as well. It is understood that the description herein is intended to be illustrative only and is not intended to be limitative. Rather, the scope of the invention described herein is limited only by the claims appended hereto.

What is claimed is:

1. A hole drilling apparatus comprising,
an angulated base member including a pair of plate means joined together to form an interior angle of less than 180°,
a pair of post members which extend from said base member,
a drill mounting plate member which is slidably mounted on said pair of post members,
resilient means mounted on at least one of said pair of post members intermediate said base member and said plate member to selectively urge relative motion therebetween,
first gear means mounted on said plate member,
second gear means mounted on one of said post members and interactive with said first gear means whereby said plate member can be moved relative to said pair of post members, and
locking means disposed adjacent to said base member to selectively lock said apparatus to a workpiece.

2. The apparatus recited in claim 1 including,
at least one level indicator means mounted on said plate member.

3. The apparatus recited in claim 1 including,
drilling means mounted to said plate member.

4. The apparatus recited in claim 1 wherein,
said first gear means comprises a spur gear, and
said second gear means comprises a rack gear.

5. The apparatus recited in claim 1 wherein,
said plate member includes a pair of spaced apart apertures therethrough for slidably receiving said pair of post members.

6. The apparatus recited in claim 1 wherein,
said post members are detachably mounted to said base member.

7. The apparatus recited in claim 6 wherein,
said base member includes a pair of receptacles mounted thereon for selectively receiving said pair of post members.

8. The apparatus recited in claim 2 wherein,
said level indicator means includes spirit levels for providing two level indications which are disposed in a 90° relationship.

9. The apparatus recited in claim 1 wherein,
said plate member includes a pivot arm at one end thereof for retaining a drill unit thereto.

10. The apparatus recited in claim 1 wherein,
said locking means includes elongated chain means.

11. The apparatus recited in claim 10 wherein,
said locking means includes adjustment means for selectively altering the size of said locking means.

12. The apparatus recited in claim 11 wherein,
said chain means is attached at one end thereof to said adjustment means,
said adjustment means includes a threaded rod means.

13. The apparatus recited in claim 11 wherein,
said locking means includes mounting means at one side of said angulated base member for receiving said adjustment means, and
aperture means at another side of said angulated base member for receiving another end of said chain means.

14. The apparatus recited in claim 1 including,
cutout portions at one end of said angulated base member to provide a measurement scale for measuring said workpiece.

15. The apparatus recited in claim 1 wherein,
said resilient means comprises a coil spring which encircles said at least one post member.

16. The apparatus recited in claim 1 including,
gear housing means mounted on said plate member for supporting said first gear means therein.

17. The apparatus recited in claim 16 wherein,
said gear housing includes an aperture therethrough for receiving said one post member and said second gear means mounted thereon in proximity to said first gear means.

18. The apparatus recited in claim 1 including,
lever means connected to said first gear means by means of an axle therethrough whereby said first gear means can be moved by selectively moving said lever means.

19. The apparatus recited in claim 13 wherein,
said mounting means comprises a tubular member extending outwardly from said one side of said angulated base member.

20. The apparatus recited in claim 9 including,
retaining means for selectively securing said pivot arm to said plate member.

21. The apparatus recited in claim 20 wherein,
said pivot arm is arcuately shaped, and
said one end of said plate member is arcuately shaped complementary to said pivot arm to provide a substantially round space therebetween.

22. The apparatus recited in claim 21 wherein,
said retaining means is adjustable so that said pivot arm can be secured to said plate member whereby said round space is adjustable.

23. The apparatus recited in claim 2 including,
fin means which extend from said plate member to substantially surround said level indicator means.

24. The apparatus recited in claim 12 wherein,
said adjustment means includes knob means engaging said threaded rod means.

25. An apparatus for supporting an electric drill comprising,
an angulated base member comprising a pair of plate means joined together to form an angle,
a pair of post members which extend from the vertex of the angle formed by said pair of plate means in said base member,
a drill mounting plate member including a pair of apertures therethrough to receive said pair of post members whereby said plate member is slideably mounted on said pair of post members,
first toothed means mounted on said plate member,
second toothed means mounted on one of said post members and interactive with said first toothed means whereby said plate member can be moved relative to said pair of post members, and
driving means connected to at least one of said first and second toothed means to selectively produce motion thereof.

* * * * *